UNITED STATES PATENT OFFICE.

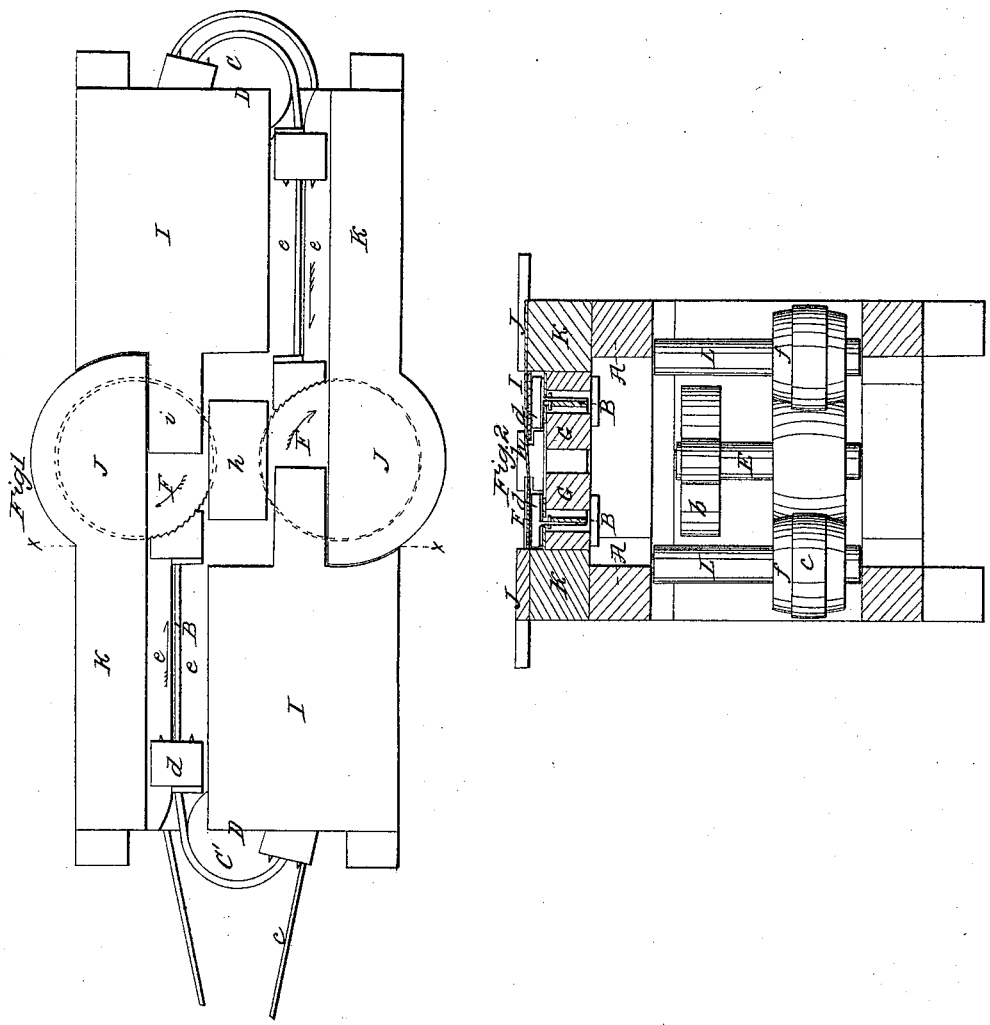

SMITH HEAD, OF MILLERSBURG, PENNSYLVANIA, ASSIGNOR TO B. STEEVER, OF SAME PLACE.

IMPROVED SHINGLE-MACHINE.

Specification forming part of Letters Patent No. 41,039, dated December 22, 1863.

*To all whom it may concern:*

Be it known that I, SMITH HEAD, of Millersburg, in the county of Dauphin and State of Pennsylvania, have invented a new and Improved Shingle-Machine; and I do hereby declare that the following is a full, clear, and exact description of the same, reference being had to the accompanying drawings, making part of this specification, in which—

Figure 1 is a plan or top view of a machine embodying my invention. Fig. 2 is a transverse sectional elevation of the same, taken in the line $x$ $x$ of Fig. 1.

Similar letters of reference indicate corresponding parts in both figures of the drawings.

This invention relates to that class of machines in which circular saws are employed for cutting the shingles from the bolt.

The invention consists in a novel arrangement of devices whereby is produced, at a moderate cost, a machine, which, with the assistance of two boys, is capable of turning out a large amount of work, and which occupies but comparatively little room, as will be hereinafter fully explained.

To enable others skilled in the art to which my invention appertains to fully understand and use the same, I will proceed to describe its construction and operation.

In the accompanying drawings, A represents the framing, which may be constructed of wood or metal in any suitable manner to support the working parts of the machine. B represents an endless belt, which is stretched over pulleys C C' on vertical shafts D D', placed in the framing, one at each end. The pulley C, which gives motion to the endless belt B, receives its motion through the medium of a cross-belt, $b$, from a vertical shaft, E, which has a rotary movement communicated to it from the driving-shaft, (not shown in the drawings,) by means of a belt, $c$. The belt B, at suitable and equal distances apart—*i. e.*, a little less than the length of the shingle it is designed to produce—is provided on its upper edge with dogs $d$, which are serrated or toothed on one edge to enable them to obtain a better hold of the block or bolt. The dogs $d$ are secured by T-shaped heads, the shanks of which pass down on the outside of the belt, and may be fastened thereto by rivets, bolts, or screws.

The belt B, in its passage from one pulley to the other over which it passes, is guided in grooves in the bed-piece by metal plates $e$, which are attached, one on each side of the belt, to the bed-piece G.

K K are head-blocks, against the inner sides of which the bolts rest while being fed up to the saws. These head-blocks extend the entire length of the frame and are securely attached thereto by bolts or in any other suitable manner.

F F are two circular saws, secured to the upper ends of shafts L L, which are supported on opposite sides of the bed-piece in suitable boxes attached to the framing on the inner side. The saws are caused to revolve in the same direction and with like velocity by means of the driving-belt $c$, which passes from the outside around the pulleys $f\,f$ on the lower end of the saw-shafts L L, thence around a pulley on shaft E.

The bolts are prevented from getting between the saws and damaging them by a guard, $h$, which is attached to the bed-piece G, between the saws, and provided in each side with a cut or kerf for the teeth of the saw to run in.

I I are metal plates, attached to the upper side of the head-blocks, and covering that portion of the endless belt which is behind the saws. These plates, near their inner edges, are made shelving to allow the bolt to be slid freely from one side of the machine to the other, and they are provided with a projecting piece, $i$, which extends over a portion of the saw, and thereby prevents the bolt from striking against the backs of its teeth.

J is a shield, which may be of wood or metal, attached to each of the head-blocks on the side opposite to that of the plates K K, and covering the outer portion of the saw, to prevent the operator or any person standing beside the machine from being injured by the saws.

The operation of the machine is as follows: The circular saws are rotated in the direction of the red arrows (shown in Fig. 1) by a belt, which passes around the pulleys $f\,f$ on saw-shafts L L, thence around the pulley on shaft E, which, being rotated thereby, imparts motion, through the intervention of the cross-belt *b* and shaft D, to the endless belt, causing it to travel in the direction of the blue arrows shown in Fig. 1. The bolts being placed, one at a time, on the plates I, they are adjusted to the belt to be sawed into shingles by a boy who stands at one side of the machine.

The dogs on the belt should be placed a little less distance apart than the length of a bolt, so that when the bolt is placed in proper position on the table to have a shingle cut from it the front end of the bolt will rest on the rear side of the dog, and the back end will rest upon the table and against the serrated part of the preceding dog, thus giving a proper taper to the shingle, the thickness of the shingle at the butt being equal to the distance the saw is from the bed piece.

As the shingle is being cut from the under side of the bolt by the saw, the bolt is advanced onto the metal plates I, whence it is taken hold of by the attendant and pushed to the opposite side of the machine against the head-block, where it is adjusted in position on the bed-piece to have the dogs carry it forward in a reverse position to the saw, and thus the operation is continued as before.

The shingles, as they are sawed from the bolt, are carried by the endless belt to the end of the machine, whence they fall onto the floor.

It will be seen from the above that the bolts have the shingles sawed from them, butt and point alternately, from each end.

Having thus described my invention, what I claim as new, and desire to secure by Letters Patent, is—

1. The combination of two circular saws, F F, with the horizontally-revolving endless belt B, grooved bed-piece G G, head-blocks K K, and guard J J, when constructed and arranged to operate in the manner and for the purpose specified.

2. The metal plates I I, in combination with the bed-piece G G, endless belt B, and circular saws F F, when arranged in the manner and for the purpose specified.

The above specification of my improved shingle-machine signed this 11th day of March, 1863.

SMITH HEAD.

Witnesses:
JAMES A. GRIDLEY,
CHARLES SMITH.